United States Patent
Lee et al.

(10) Patent No.: US 9,785,472 B2
(45) Date of Patent: Oct. 10, 2017

(54) COMPUTING CLUSTER PERFORMANCE SIMULATION USING A GENETIC ALGORITHM SOLUTION

(75) Inventors: Gunho Lee, Albany, CA (US); Niraj Tolia, Mountain View, CA (US); Parthasarathy Ranganathan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1967 days.

(21) Appl. No.: 12/813,635

(22) Filed: Jun. 11, 2010

(65) Prior Publication Data

US 2011/0307899 A1 Dec. 15, 2011

(51) Int. Cl.
*G06F 9/46* (2006.01)
*G06F 9/50* (2006.01)

(52) U.S. Cl.
CPC ...... *G06F 9/5027* (2013.01); *G06F 2209/501* (2013.01)

(58) Field of Classification Search
CPC .................................................. G06F 9/5027
USPC ....................................................... 718/104
See application file for complete search history.

(56) References Cited

U.S. PATENT DOCUMENTS 7,657,497 B2 2/2010 Nandy

OTHER PUBLICATIONS

Vincenzo Di Martino, "Sub Optimal Scheduling in a Grid using Genetic Algorithms", 2003, IEEE, pp. 1-7.*
Sonke Hartmann, "Self-Adapting Genetic Algorithms with an Application to Project Scheduling", 1999, pp. 1-24.*

* cited by examiner

*Primary Examiner* — Timothy A Mudrick
(74) *Attorney, Agent, or Firm* — Hewlett Packard Enterprise Patent Department (57) ABSTRACT

Illustrated is a system and method that includes identifying a search space based upon available resources, the search space to be used to satisfy a resource request. The system and method also includes selecting from the search space an initial candidate set, each candidate of the candidate set representing a potential resource allocation to satisfy the resource request. The system and method further includes assigning a fitness score, based upon a predicted performance, to each member of the candidate set. The system and method also includes transforming the candidate set into a fittest candidate set, the fittest candidate set having a best predicted performance to satisfy the resource request.

18 Claims, 12 Drawing Sheets

COMPUTING CLUSTER PERFORMANCE SIMULATION USING A GENETIC ALGORITHM SOLUTION

BACKGROUND

MapReduce and Hadoop are software frameworks used for the processing of a job in a distributed computing environment. MapReduce is described in U.S. Pat. No. 7,650,331 titled "System and method for efficient large-scale data processing." At its core, a MapReduce is centered around two functions: a map function and a reduce function. The framework converts the input data (i.e., the job) into key and value pairs ([K_1,V_1]) which the map function then translates into new output pairs ([K_2,V_2]). The framework then groups all values for a particular key together and uses the reduce function to translate this group to a new output pair ([K_3,V_3]).

Hadoop is implemented in conjunction with MapReduce to introduce the concept of "rack awareness" into the distributed computing architecture. Specifically, Hadoop allows for the geographical proximity of the various worker nodes, and resources associated therewith, to be taken into account when sub-jobs are distributed. By minimizing the geographical distance between worker nodes and data nodes, network bandwidth is conserved. (See <http://hadoop.apache.org/>.)

In modern distributed computing architectures, such as Infrastructure-as-a-Service (IaaS) or "cloud" systems, users rent compute cycles, storage, and bandwidth with small minimum billing units (e.g., an hour or less for compute and per-MB for storage and bandwidth) and almost instant provisioning latency (minutes or seconds). These systems contrast with traditional data center co-location centers (colos), where equipment leases span months and provisioning resources can take days or longer. In such cloud systems, the efficient usage of computing resources results in less rental costs.

BRIEF DESCRIPTION OF THE DRAWINGS

Some embodiments of the invention are described, by way of example, with respect to the following figures.

DETAILED DESCRIPTION

Illustrated is a system and method for TARA to setup a MapReduce cluster to be used in processing a job. TARA is implemented, as a TARA module, through the use of a lightweight MapReduce simulator and a genetic algorithm-based search technique. Specifically, a prediction engine is implemented, as part of the TARA module, which is responsible for optimizing resource allocation. When it receives a resource request, the prediction engine iterates through the possible subsets of available "candidates" and identifies an allocation of candidates that optimizes estimated job completion time. A genetic algorithm-based search technique is then implemented, as part the prediction engine, to a search for the fittest candidate(s) to process the job.

In some example embodiments, the TARA prediction engine is implemented to identify the fittest candidates for the MapReduce cluster used to process a job. A cluster is a group of linked computers, working together closely so that in many respects they form a single computer. One or more clusters may make up a search space, the one or more clusters representing candidates within the search space. The fittest candidates are identified by the prediction engine through a two-part process. In the first part of the process, fit candidates are identified by the prediction engine which maps a candidate resource allocation to a fitness score that measures the fitness of a candidate with respect to a given objective function. As part of the process for assigning a fitness score to each of the candidates, a light-weight MapReduce simulation is run for each of the candidates. This fitness score also captures relative behavior and allows TARA to compare and rank different candidates.

In the second part of the two-part process, the prediction engine identifies the fittest of the candidates through the use of a genetic algorithm-based search technique. The fitness score of a candidate is represented as a bit string. Specifically, a candidate may be represented as the bit string "11100," where "1" denotes a physical server that is selected for hosting a Virtual Machine (VM) that is to be used as part of a MapReduce cluster. In contrast, "0" represents a physical server, and associated VMs, that has not been selected to be part of the MapReduce cluster. Each server can host one or more VMs for a particular resource allocation request. As will be described in more detail below, through the use of the bit string as a genetic code for a candidate, the fittest candidate(s) can be identified through a process of initialization, reproduction, selection, and termination.

Figure 1:
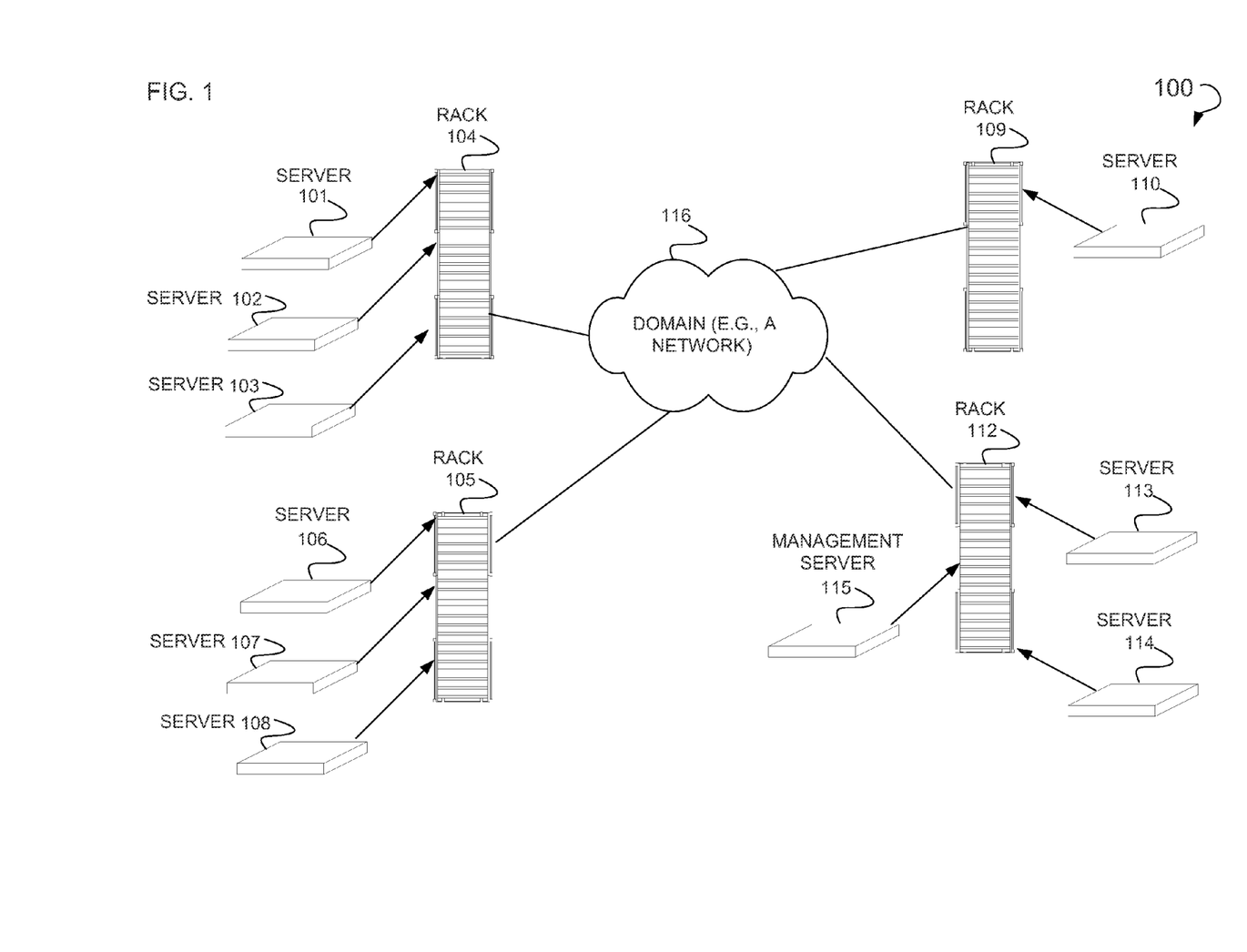
FIG. 1 is a diagram of a cloud system, according to an example embodiment, that uses Topology Aware Resource Allocation (TARA) to setup a MapReduce cluster to be used in solving a problem.

FIG. 1 is a diagram of an example cloud system 100 that uses TARA to setup a MapReduce cluster to be used in solving a problem. Shown are servers 101-103 that reside on a rack 104. Also shown are servers 106-108 that reside on the rack 105. Additionally shown is server 110 that reside on the rack 109. Servers 113-114, and management server 115, are shown as residing on the rack 112. As illustrated, a domain 116 may be used to operatively connect each of the servers and the management server 115. Operatively connect, as used herein, includes a logical or physical connection. As will be discussed in more detail below, one or more of these servers may be identified as a candidate to be part of a MapReduce cluster. The management server 115 may be used to implement TARA to identify the MapReduce cluster, and the fittest candidate(s) associated with this cluster.

Figure 2:
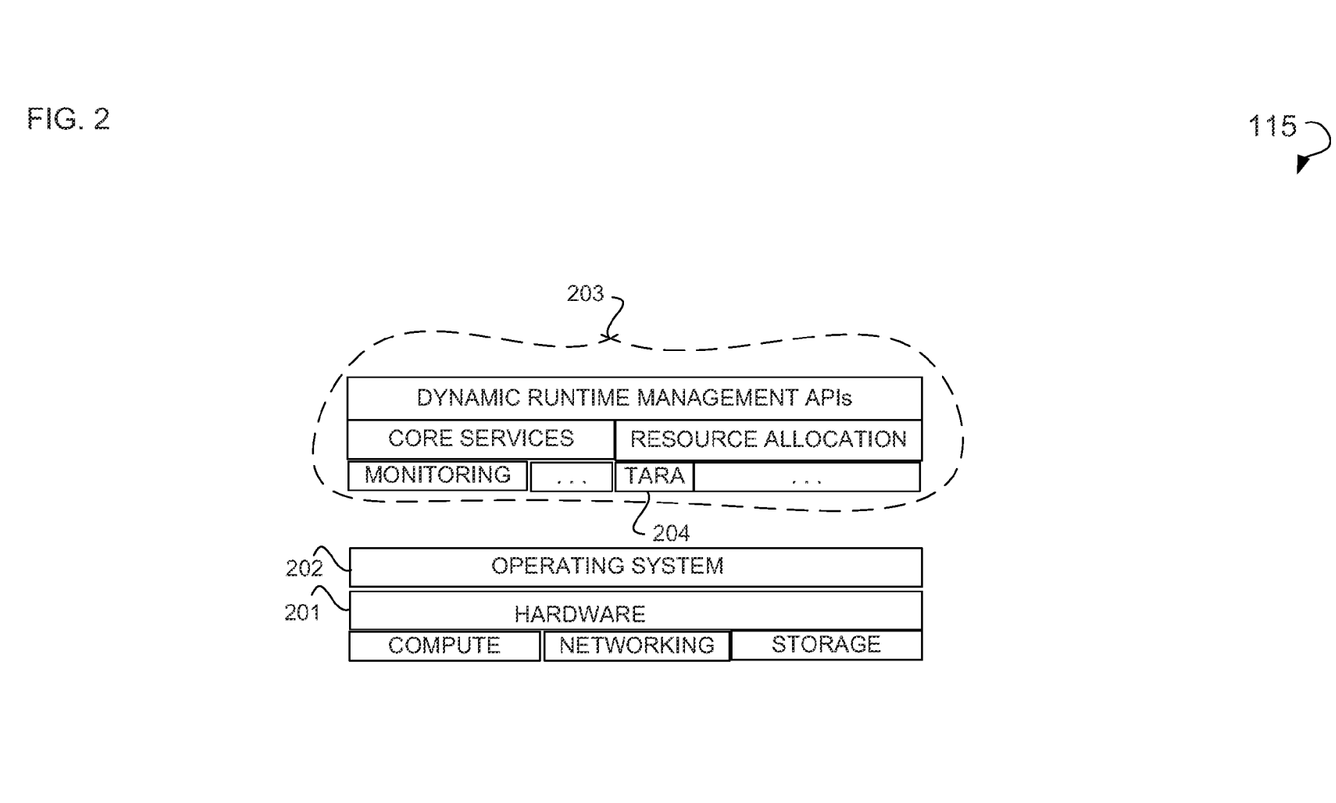
FIG. 2 is a diagram of a management server, according to an example embodiment, illustrating how a TARA module integrates into a management server stack.

FIG. 2 is a diagram of an example management server 115 illustrating how a TARA module integrates into a management server stack. Shown are a hardware layer 201 and an operating system layer 202. Residing upon the operating system layer 202 is a management layer 203 that is used by the management server 115 to manage the cloud system 100. In some example embodiments, the management layer 203 resides on a virtualization layer (i.e., a hypervisor or virtual machine manager layer) as opposed to the operating system layer 202. Included in the management layer 203 is a TARA module 204. The TARA module 204 uses application and topology-specific information to optimize resource allocation, and it forms a part of the resource allocation subsystem for the management layer 203. As part of optimizing resource allocation, the TARA module 204 may make calls to a monitoring module that, in turn, asks for resource information from management sub-systems. Example management sub-systems include an Integrated Lights Out (iLO™) service processor, an XEN™ dom0, or a hypervisor. Further, a core services module may be accessible to the TARA module 204, via the monitoring module, that allows for the TARA module 204 to obtain information regarding load balancing, billing/cost information and other information associated with using the cloud system 100. In certain cases, the monitoring module maintains a snapshot of the resource allocation and core services information to be accessed by the TARA module 204, where necessary. The management layer 203 may be accessible by a customer of the cloud system 100 via an Application Programming Interface (API).

Figure 3:
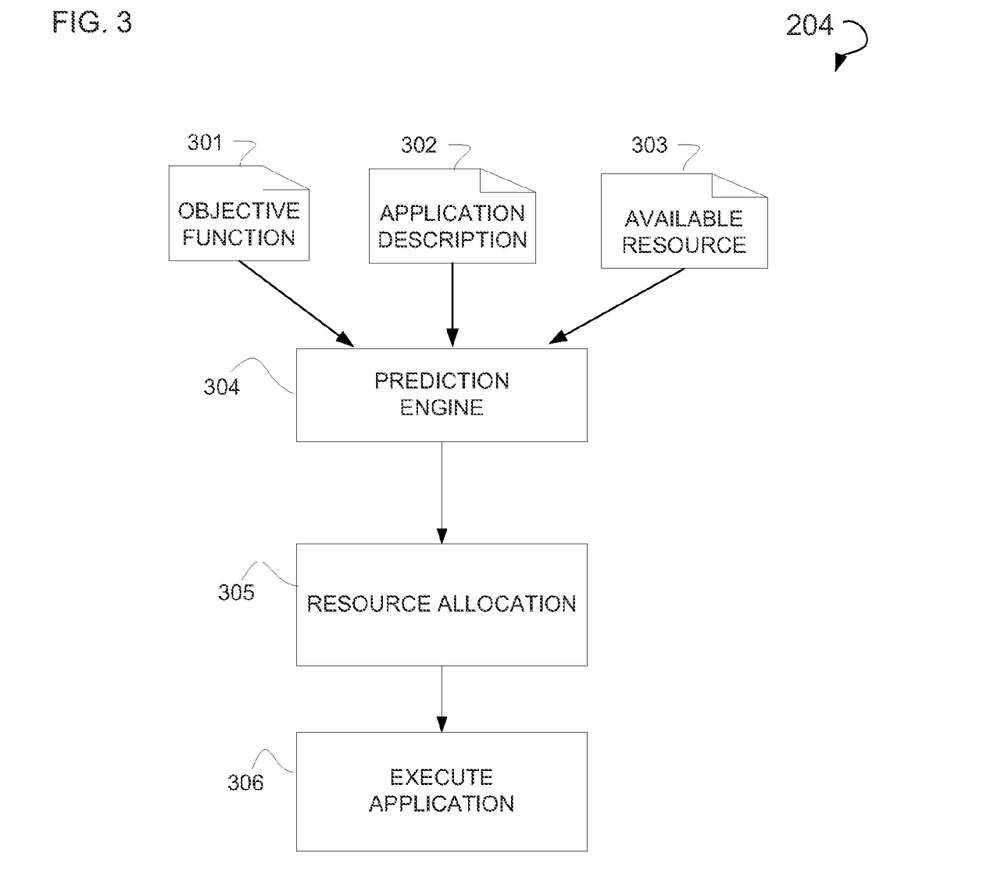
FIG. 3 is a diagram of the architecture of the TARA module, according to an example embodiment, showing the inputs and outputs for this module.

FIG. 3 is a diagram of the example architecture of the TARA module 204 showing the inputs and outputs for this module. Shown are inputs in the form of the objective function 301, application description 302, and available resources 303. Output from the prediction engine 304 is provided to a resource allocation engine 305 that identifies a MapReduce cluster made up of the fittest of the candidates for a job. As denoted at module 306, the job is processes or executed by the MapReduce cluster made up of these fittest candidates. The method for generating output for the TARA module 204 is illustrated below.

Regarding the inputs for the prediction engine 304, the objective function 301 defines the metric for which the TARA module 204 should optimize. For example, given the increasing cost and scarcity of power in the cloud system 100, an objective function might measure the increase in power usage due to a particular resource allocation. Alternate example objective functions measure performance in terms of throughput or latency or even combine these into a single performance/Watt metric. Still other example object functions use MapReduce job completion time as the optimization metric as it directly maps to the monetary cost of executing the job on the cloud system. The output value for the objective function 301 is calculated using the MapReduce simulator described below. Note that a candidate allocation might be a good fit for a given objective function but a bad fit for another. For example, an application distributed across a number of racks might obtain the best performance, but could cause the greatest increase in power usage. In some example embodiments, the objective function 301 is a multi-objective function that is used by the prediction engine 304.

The application description 302 input is used by the prediction engine 304 to determine application behavior once resources are allocated. The application description 302 includes three parts: 1) the framework type that identifies the framework model to use, 2) workload specific parameters that describe the particular application's resource usage and 3) a request for resources including the number of VMs, storage, etc. The prediction engine 304 uses a model-based approach to predict the behavior of the given application on the selected framework. As each framework behaves differently, TARA-based systems (e.g., the cloud system 100) require a model for the framework being optimized and the specified framework type is used to choose the correct model. In some example embodiments, if the framework type is not supported or the information is absent, the cloud system 100 defaults to an application-independent allocation scheme such as a Round Robin or Greedy placement algorithm.

Where the correct model is identified based on the framework type, the prediction engine 304 may request additional runtime-specific information to predict performance. This additional runtime-specific information may be defined by the objective function 301. This information may be further divided into two groups: 1) framework-specific configuration parameters and job, or 2) application-specific resource requirements. Framework-specific parameters define the configuration of the application-level environment within which the job executes. Examples include the number of threads available in a web server or the number of map and reduce slots configured in the MapReduce framework. This information may be automatically derived from configuration files and, in particular, from Hadoop's cluster-specific conf/hadoop-site.xml file. Tuning these parameters is an orthogonal optimization is important as the framework configuration can also significantly impact performance. The application-specific resource requirements and model include selectivity (e.g., input/output ratio) during the map phase, Central Processing Unit (CPU) cycles required per input record for both map and reduce tasks, CPU overhead per task, and the communication requirement for the average task.

The available resources 303 input provides a snapshot of the resources available to the TARA module 204 from the cloud system 100. This input includes information derived from both the virtualization layer and the core monitoring service shown in FIG. 2. The information gathered includes a list of available servers, current load and available capacity on individual servers, and the processing power of virtual CPUs to data center topology and a recent measurement of available bandwidth on each network link. Topology information for the cloud system 100 can be obtained using a Simple Network Management Protocol (SNMP) from a cloud monitoring service for the cloud 100. Alternatively, if switch support is unavailable but end nodes can be controlled, tools such as pathChirp can also estimate available link bandwidth.

Figure 4:
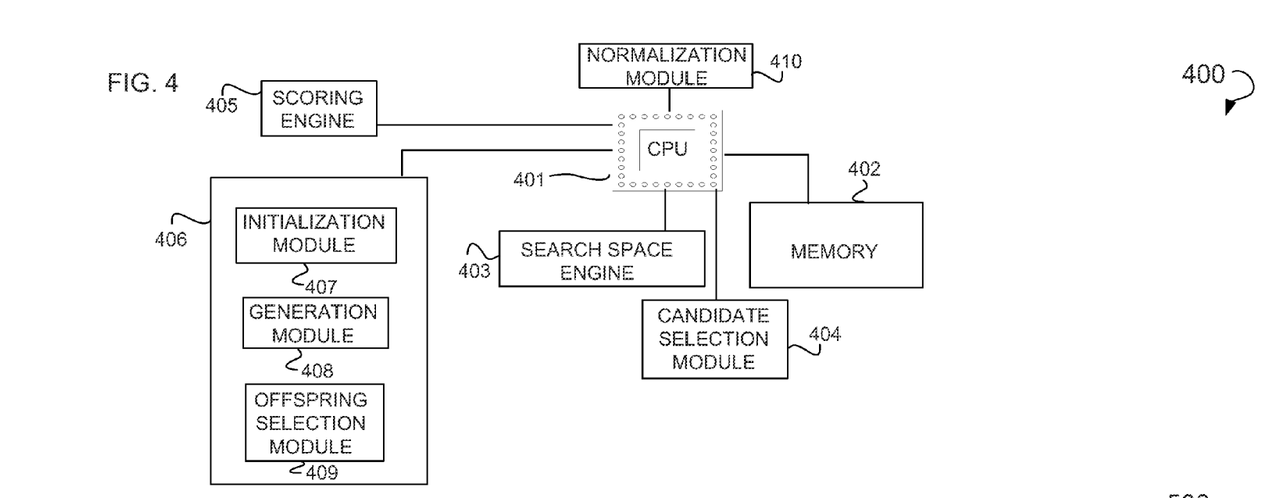
FIG. 4 is a block diagram of a system, according to an example embodiment, illustrating the prediction engine used to identify the fittest candidate for a MapReduce cluster to be used to process a job.

FIG. 4 is a block diagram of an example system 400 illustrating the prediction engine 304 used to identify the fittest candidate for a MapReduce cluster to be used to process a job. These various blocks may be implemented in hardware, firmware, or software. Further, these various blocks are operatively connected in terms of being logically or physically connected. Shown is a CPU 401 operatively connected to a memory 402. Operatively connected to the CPU 401 is a search space engine 403 executed to identify a search space based upon available resources, the search space to be used to satisfy a resource request. A candidate selection module 404 is operatively connected to the CPU 401 and is executed to select from the search space an initial candidate set, each candidate of the candidate set representing a potential resource allocation to satisfy the resource request. A scoring engine 405 is operatively connected to the CPU 401 to assign a fitness score, based upon a predicted performance, to each member of the candidate set. A transformation engine 406 is operatively connected to the CPU 401 to transform the candidate set into a fittest candidate set, the fittest candidate set having a best predicted performance to satisfy the resource request. In some example embodiments, the resource request is for an available resource that is part of a cluster used to perform a job. Additionally, the available resource may include at least one of network bandwidth, CPU cycles, electrical power, or memory usage. In some example embodiments, the predicted performance includes simulating a usage of each member of the candidate set. The fitness score may be a comparable value that indicates a predicted performance of a candidate as compared to a predicted performance of another candidate of the initial candidate set. Included within the transformation engine 406 are modules to transform the candidate set into the fittest candidate set, these modules to include an initialization module 407 executed to initialize the initial candidate set, a generation module 408 executed to generate offspring from the initial candidate set, and a offspring selection module 409 executed to select the fittest candidates from the offspring. In some example embodiments, the generate of the offspring uses a method that includes at least one of mutation, swapping, or crossover. Also residing on the transformation engine 406 is a normalization module 410 executed to normalize the offspring to match a number of servers used by each member of the initial candidate set. In some example embodiments, the best predicted performance is a comparable value that indicates a highest predicted performance of a candidate as compared to a highest predicted performance of another candidate of the initial candidate set.

Figure 5:
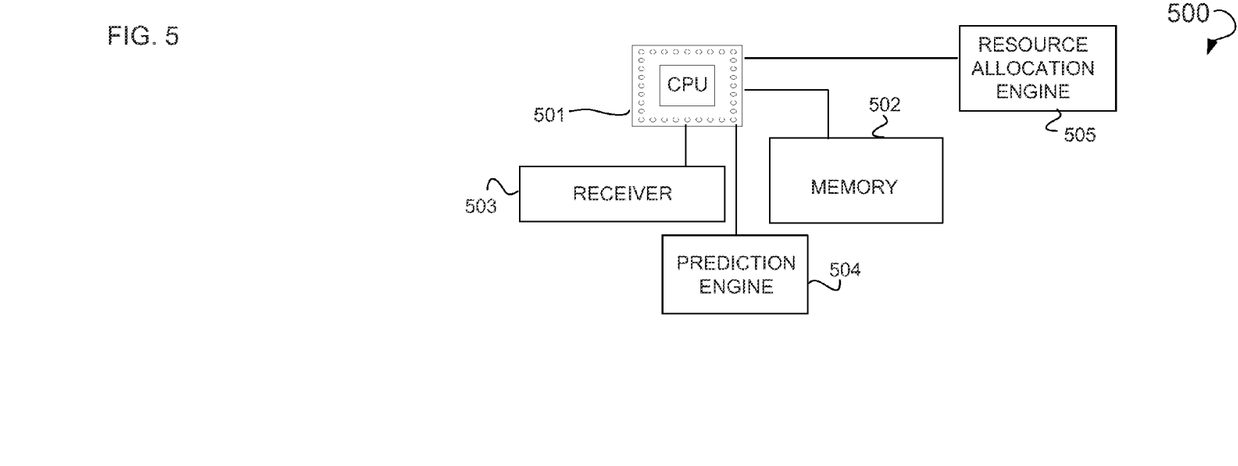
FIG. 5 is a block diagram of an apparatus, according to an example embodiment, illustrating the management server used to identify the fittest candidate for a MapReduce cluster to be used to process a job.

FIG. 5 is a block diagram of an example apparatus 500 illustrating the management server 115 used to identify the fittest candidate for a MapReduce cluster to be used to process a job. These various blocks may be implemented in hardware, firmware, or software. Further, these various blocks are operatively connected in terms of being logically or physically connected. Shown is a CPU 501 operatively connected to a memory 502. Operatively connected to the CPU 501 is a receiver 503 executed to receive input to identify a set of fit candidates, the set of fit candidates associated with resources to perform a job. Operatively connected to the CPU 501 is a prediction engine 504 that is executed to identify a set of fittest candidates that is generated from the set of fit candidates, the fittest candidates to be offspring of the set of fit candidates and to be associated with the resources. The prediction engine 304 and 504 may have similar functionality. Operatively connected to the CPU 501 is a resource allocation engine 505 executed to allocate the resources associated with the set of fittest candidates to perform the job. In some example embodiments, the input includes at least one of an objective function, an application description, or an available resource. In some example embodiments, the apparatus is at least one of a computer system, or plurality of computer systems. In some example embodiments, the resources includes at least one of network bandwidth, CPU cycles, electrical power, or memory usage.

Figure 6:
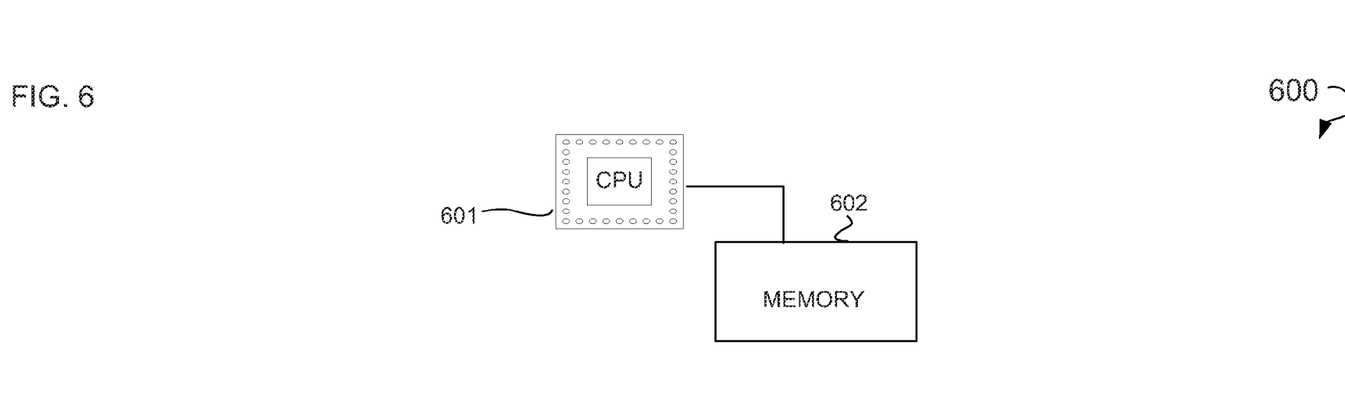
FIG. 6 is a diagram of a system, according to an example embodiment, illustrating the prediction engine used to identify the fittest candidate for a MapReduce cluster to be used to process a job.

FIG. 6 is a diagram of an example system 600 illustrating the prediction engine 304 used to identify the fittest candidate for a MapReduce cluster to be used to process a job. This system 600 may include a CPU 601 operatively coupled to a memory 602. Residing on the memory 602 may be logic encoded in one or more tangible media for execution and when executed operable to identify a search space based upon available resources, the search space to be used to satisfy a resource request. The logic may also be executed to select from the search space an initial candidate set, each candidate of the candidate set to represent a potential resource allocation to satisfy the resource request. Further, the logic may be executed to assign a fitness score, based upon a predicted performance, to each member of the candidate set. Additionally, the logic may be executed to transform the candidate set into a fittest candidate set, the fittest candidate set to have a best predicted performance to satisfy the resource request. In some example embodiments, the resource request is for an available resource that is part of a cluster used to perform a job. In some example embodiments, the available resource includes at least one of network bandwidth, CPU cycles, electrical power, or memory usage. In some example embodiments, the predicted performance includes simulating a usage of each member of the candidate set. The fitness score may be a comparable value that indicates a predicted performance of a candidate as compared to a predicted performance of another candidate of the initial candidate set. The transforming the candidate set into the fittest candidate set may include logic encoded in one or more tangible media for execution and when executed operable to initialize the initial candidate set, generate offspring from the initial candidate set, and select the fittest candidates from the offspring. In some example embodiments, the generating of the offspring uses a method that includes at least one of mutation, swapping, or crossover.

Figure 7:
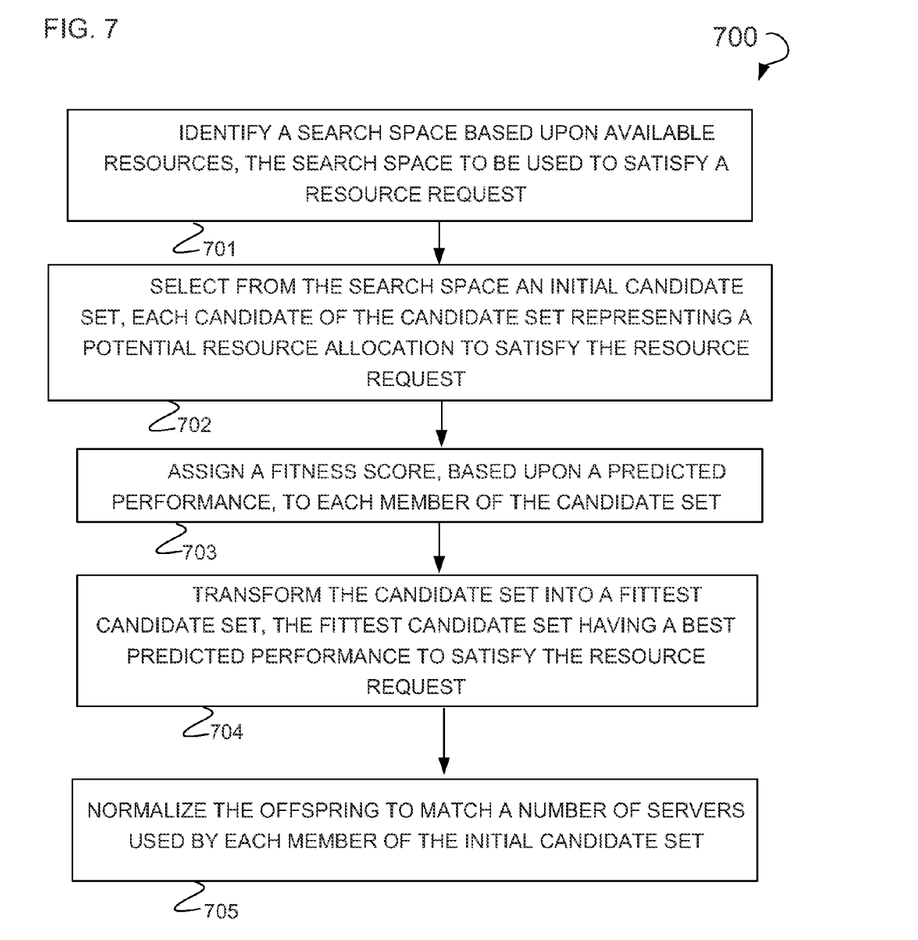
FIG. 7 is a flow chart illustrating a method, according to an example embodiment, that is executed to identify the fittest candidate for a MapReduce cluster to be used to process a job.

FIG. 7 is a flow chart illustrating an example method 700 that is executed to identify the fittest candidate for a MapReduce cluster to be used to process a job. This method 700 may be executed by the management server 115. Operation 701 is executed by the search space engine 403 to identify a search space based upon available resources, the search space to be used to satisfy a resource request. Operation 702 is executed by the candidate selection module 404 to select from the search space an initial candidate set, each candidate of the candidate set representing a potential resource allocation to satisfy the resource request. Operation 703 is executed by the scoring engine 405 to assign a fitness score, based upon a predicted performance, to each member of the candidate set. Operation 704 is executed by the transformation engine 406 to transform the candidate set into a fittest candidate set, the fittest candidate set having a best predicted performance to satisfy the resource request. In some example embodiments, the resource request is for an available resource that is part of a cluster used to perform a job. In some example embodiments, the available resource includes at least one of network bandwidth, CPU cycles, electrical power, or memory usage. In some example embodiments, the predicted performance includes simulating a usage of each member of the candidate set. In some example embodiments, the fitness score is a comparable value that indicates a predicted performance of a candidate as compared to a predicted performance of another candidate of the initial candidate set. In some example embodiments, transforming the candidate set into the fittest candidate set includes initializing the initial candidate set, generating offspring from the initial candidate set, and selecting the fittest candidates from the offspring. In some example embodiments, the generating of the offspring uses a method that includes at least one of mutation, swapping, or crossover. Operation 705 is executed by the normalization module 410 to normalize the offspring to match a number of servers used by each member of the initial candidate set. In some example embodiments, the best predicted performance is a comparable value that indicates a highest predicted performance of a candidate as compared to a highest predicted performance of another candidate of the initial candidate set.

Figure 8:
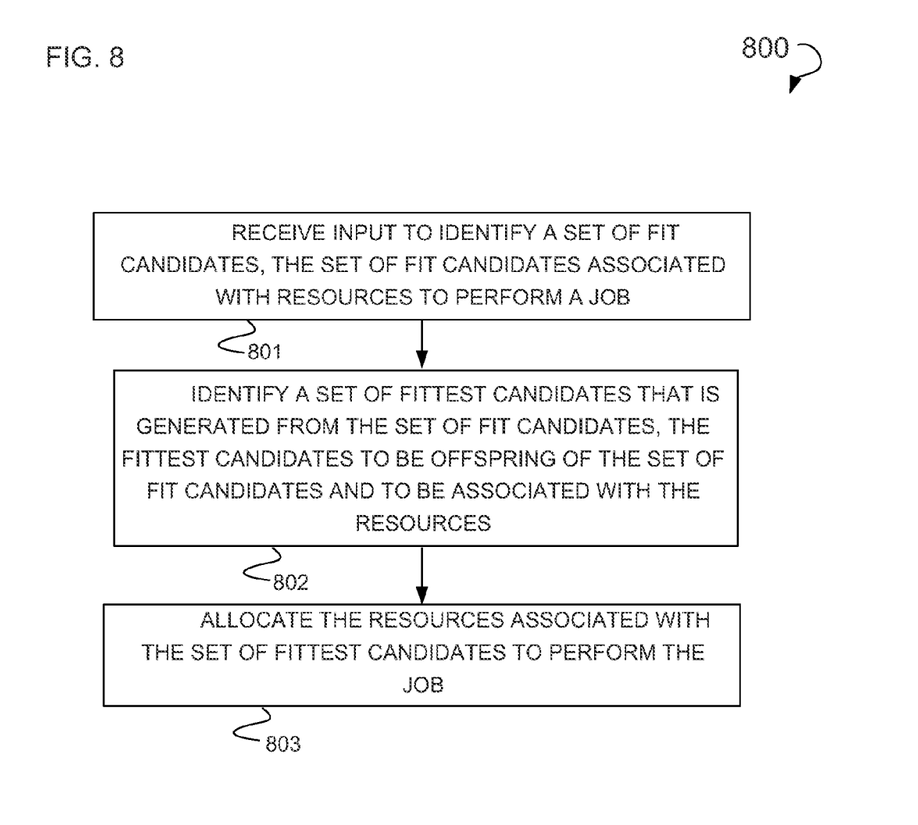
FIG. 8 is a flow chart illustrating a method, according to an example embodiment, executed to identify the fittest candidate for a MapReduce cluster to be used to process a job.

FIG. 8 is a flow chart illustrating an example method 800 executed to identify the fittest candidate for a MapReduce cluster to be used to process a job. This method 800 may be executed by the management server 115. Operation 801 is executed by the receiver 503 to receive input to identify a set of fit candidates, the set of fit candidates associated with resources to perform a job. Operation 802 is executed by the prediction engine 504 to identify a set of fittest candidates that is generated from the set of fit candidates, the fittest candidates to be offspring of the set of fit candidates and to be associated with the resources. Operation 803 is executed by the resource allocation engine 505 to allocate the resources associated with the set of fittest candidates to perform the job. In some example embodiments, the input includes at least one of an objective function, an application description, or an available resource. In some example embodiments, the resources include at least one of network bandwidth, CPU cycles, electrical power, or memory usage.

Figure 9:
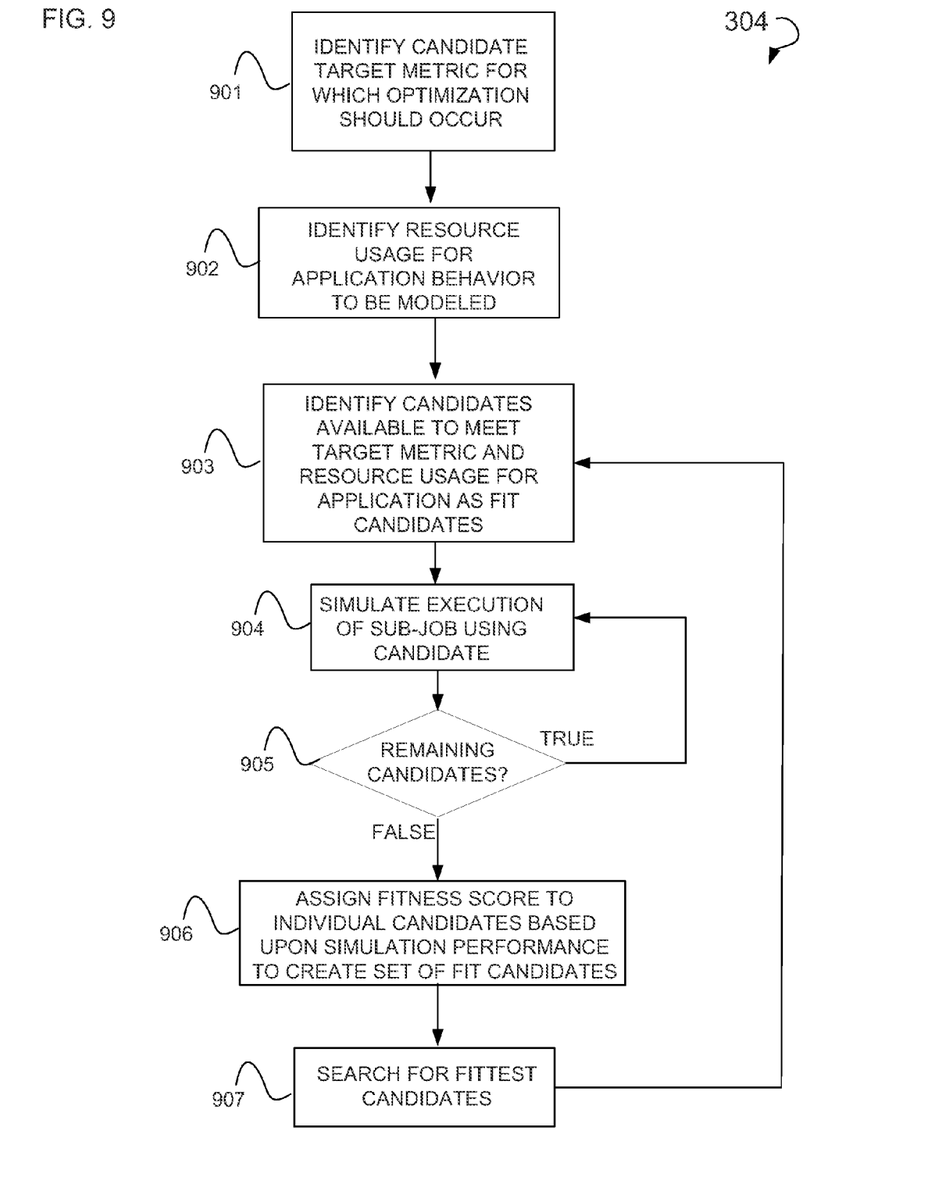
FIG. 9 is a flow chart illustrating an execution of a prediction engine, according to an example embodiment, used to identify the fittest candidates for a MapReduce cluster to be used to process a job.

FIG. 9 is a flow chart illustrating an example execution of the prediction engine 304 used to identify the fittest candidate for a MapReduce cluster to be used to process a job. Shown is an operation 901 that is executed to identify a candidate target metric for which optimization should occur. This target metric may be provided as part of the objective function 301. An operation 902 is executed to identify resource usage for a particular application behavior to be modeled. This resource usage may be provided as part of the application description 302, and specifically the workload-specific parameters that describe the particular application's resource usage. Operation 903 is executed to identify candidate(s) available to meet target metric and resource usage for an application, where these candidates would be fit candidates. These candidates may be provided as part of the available resources 303. Operation 904 is executed to simulate the execution of a job or sub-job using the candidate. In some example embodiments, as is discussed in more detail below, a MapReduce implementation is used by the candidate in the simulated processing of the job or sub-job. Decision operation 905 is executed to determine whether there are remaining candidates for which identification and simulation is to occur. In cases where decision operation 905 evaluates to "true," an operation 904 occurs. In cases where decision operation 905 evaluates to "false," an operation 906 occurs. Operation 906 is executed assign a fitness score to individual candidates cases upon the simulation performance. This score may be based upon the ability of the candidate to meet the target metric. Operation 907 is executed to search for the fittest candidate(s). This operation 907 includes the execution of a genetic algorithm based solution.

With respect to the execution of the operation 904, to enable fast scoring for each candidate, a simplified execution model may be used instead of attempting a full-system simulation. For example, a stream-based approach to simulate network traffic can be implemented. Similarly, a simple disk model instead of a DiskSim-based approach may be used to simulate memory usage. As input, the simulator may use the application description, and cloud system or IaaS resource information. Further, the operation 907 may be the source of additional allocation candidates (e.g., new candidates) such that the fittest of the candidates may be injected back into the pool fit candidates and ultimately cycled back through the operations 903-907. In some example embodiments, candidates are identified to host map and reduce tasks (i.e., perform MapReduce on a sub-job), and to read input data (e.g., sub-jobs) from local or remote file system nodes (e.g., Hadoop File System (HDFS) nodes). Further, the candidates are to execute the user-defined map and reduce functions on the input, and either store the intermediate output on local disk or write the final output back to the file system. For map or reduce task, the operation 904 may allocate CPU cycles that are proportional to the input size instead of performing the actual computation. Further, if the selected server or network links has other workloads present, the operation 904 may also account for the resources already in use by utilizing the information described in the available resource 303 input.

In some example embodiments, during the execution of operation 904 each map task performed by the candidate consumes a fraction of the input data and generates intermediate output. The size of intermediate output is determined by the selectivity or input/output ratio that was obtained from the job-specific information defined by the application description 302. While the size of the intermediate output may vary depending on the contents of the input data, operation 904 assumes that it is proportional to the size of input. Following the map step, each reducer performs a network copy of the intermediate output generated by the map tasks. The maximum parallel copies per reduce and the number of concurrent streams per node allowed is also defined in the framework-specific portion of the application description 302. Further, the TARA module 204 may optimize MapReduce jobs individually (i.e., it optimizes the incoming workload based on the currently executing workloads in the IaaS system). If the TARA module 204 is faced with multiple simultaneous requests, it may serialize the requests to prevent inaccurate predictions.

Figure 10:
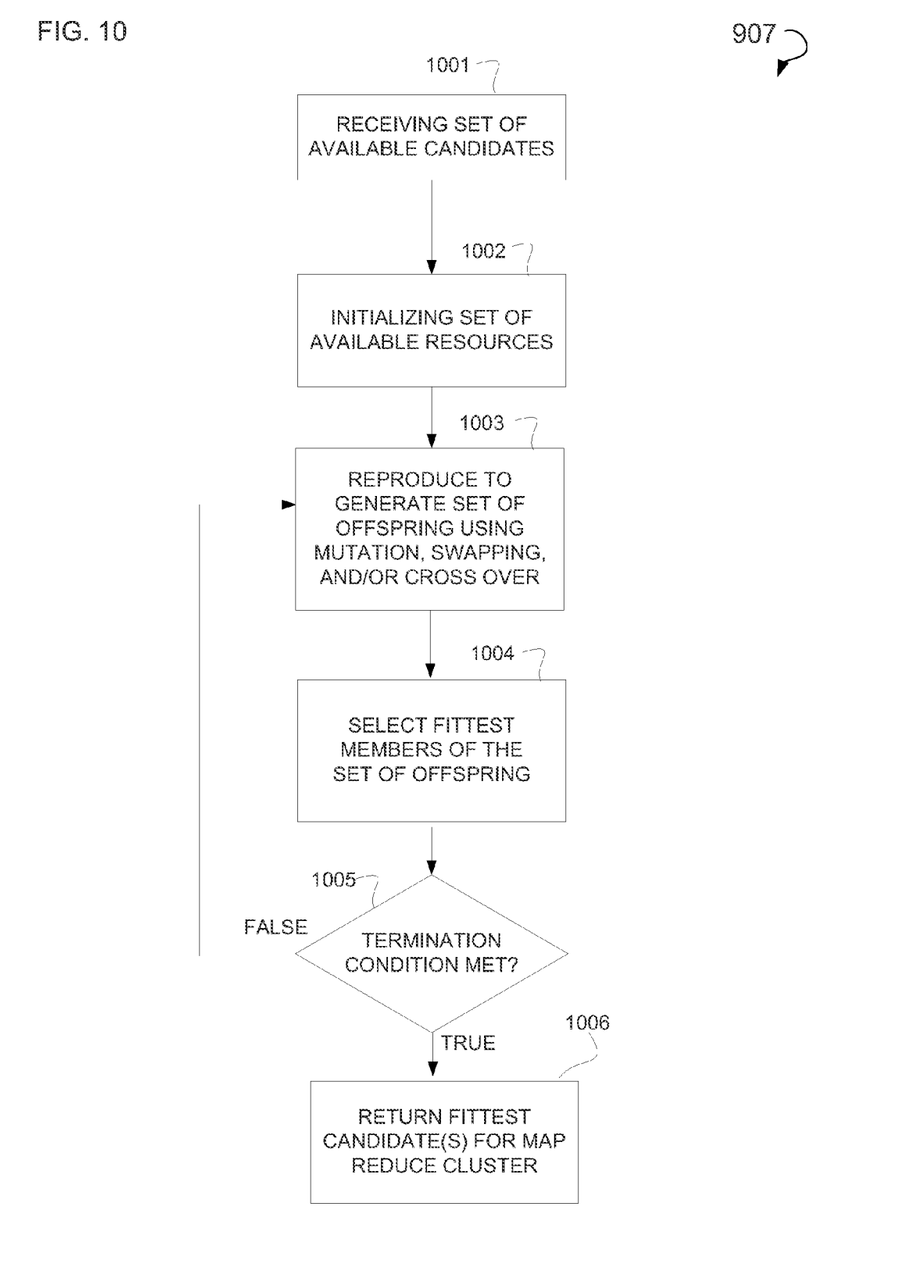
FIG. 10 is a flow chart illustrating the execution of an operation, according to an example embodiment, to search for the fittest candidate(s) through the use of a genetic algorithm based solution.

FIG. 10 is a flow chart illustrating the example execution of operation 907 to search for the fittest candidate(s) through the use of a genetic algorithm based solution. Shown is an operation 1001 that is executed to receive a set of available candidates. Operation 1002 is executed to initialize the set of available resources. Operation 1003 is executed to reproduce and generate a set of offspring using mutation, swapping and/or crossover. An offspring, as used herein, is a candidate generated from another candidate using mutation, swapping, and/or crossover. Operation 1004 is executed to select the fittest member of the set of offspring. Decision operation 1005 is executed to determine whether termination condition is met to cease the reproduction of the candidates. In cases where decision operation 1005 evaluates to "false," the operation 1003 is re-executed. In cases where decision operation 1005 evaluates to "true," operation 1006 is executed. Operation 1006 is executed to return the fittest candidate(s) for use as part of a MapReduce cluster to process a job or sub-job.

Regarding the execution of the operation 1002, the initial population set of fit candidates may be identified through a random selection process. The initial population may optionally contain candidates selected by heuristics to improve the quality of final fittest candidates. As to operation 1003, mutation, swap, or crossover operations are applied at random to the candidate set of fit candidates. Mutation, as used herein, is an operation that exchanges two single bits in the bit string representing the candidate such that one server is exchanged with another server. For example, if a candidate is represented as "11100," by applying mutation to this candidate that candidate is now represented as a new candidate (i.e., an offspring) using the bit string "01101." Metaphorically, the genetic code of the candidate has been mutated. Swapping, as used herein, includes the replacing of more than one server associated with a rack with more than one server from another rack. For example, if a candidate is represented as "01101," by applying swapping to this candidate that candidate is now represented as a new candidate (i.e., an offspring) using the bit string "10011." Of note, mutation and swapping occur within a single candidate. Crossover, as used herein, includes the combining of portions of different candidates into a new candidate (i.e., represented metaphorically as off spring). For example, if a first candidate is represented by the bit string "10101" and a second candidate is represented via the bit string "10011," then by applying the crossover operation to these two candidates (i.e., parents) that may create a new candidate (i.e., a child or offspring) represented by the bit string "10111." After the crossover operation is applied, there might be a different number of servers selected than what is initially requested by the job. If this occurs, the search algorithm may randomly adjust (e.g., flip bits, truncate bits), or normalize, the new candidate to match the number of originally selected servers requested by the job.

As to the execution of operation 1004, for each new candidate created through the execution of operation 1003, operations 901-906 are applied to this new candidate to determine the candidate's performance. Once each candidate has been evaluated, a stochastic process is used to select a majority of the "fitter" candidates along with a small percentage of "weak" candidates so as to maintain population diversity. For example, every new generation could have at least 10% new offspring.

Regarding the execution of decision operation 1005, a termination condition can be met where sufficient diversity has occurred. Sufficient diversity can be based upon of termination of a predetermined time period (e.g., a tunable time limit) during which the TARA module 204 is executed. Sufficient diversity may also be based upon identifying candidates that are better than other candidates and associated resource allocation schemes, where better is based upon the ability of the candidate to meet the target metric as defined in the allocation function 301.

Figure 11:
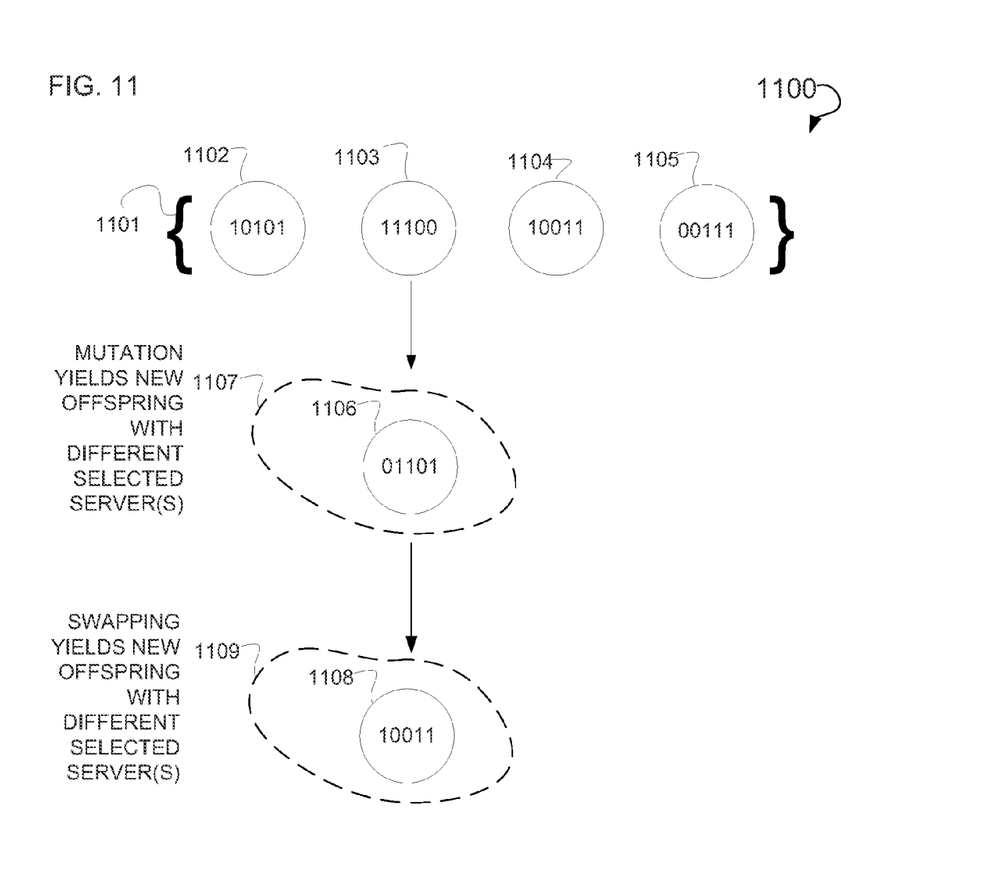
FIG. 11 is a diagram of a system, according to an example embodiment, to create a new candidate using mutation and/or swapping.

FIG. 11 is a diagram of an example system 1100 to create a new candidate using mutation and/or swapping. Shown is a fit candidate set 1101 that includes fit candidates 1102-1105. Each of these fit candidates includes bit string representation of the candidate such that candidate 1102 includes bit string "10101," candidate 1103 includes bit string "11100," candidate 1104 includes bit string "10011," and candidate 1105 includes bit string "00110." As previously discussed, "1," represents the existence of a server, and "0," represents the non-existence of a server as part of the candidate. For the purpose of illustration only, candidate 1102 may correspond to the rack 104, while candidates 1103, 1104, and 1105 may correspond to the racks 105, 109, and 112 respectively. As shown at 1107, through applying mutation to the candidate 1103, the binary string of 1103 is changed from "11100" to "01101" to create a new candidate 1106. Further, as shown at 1109, through applying swapping to the candidate 1106 a new candidate 1108 is created such that "01101" to changed to "10011." The mutation of 1103 could reflect the exchanging of one server on the rack 104 with another server on the rack 104 so as to maintain the fitness of the candidate in its use of three servers. Additionally, the swapping of "01101" for "10011" could reflect the swapping of servers 102-103, of rack 104, for the servers 107-108 of the rack 105. This swapping could be performed so as to match the number of originally selected servers requested by the job.

Figure 12:
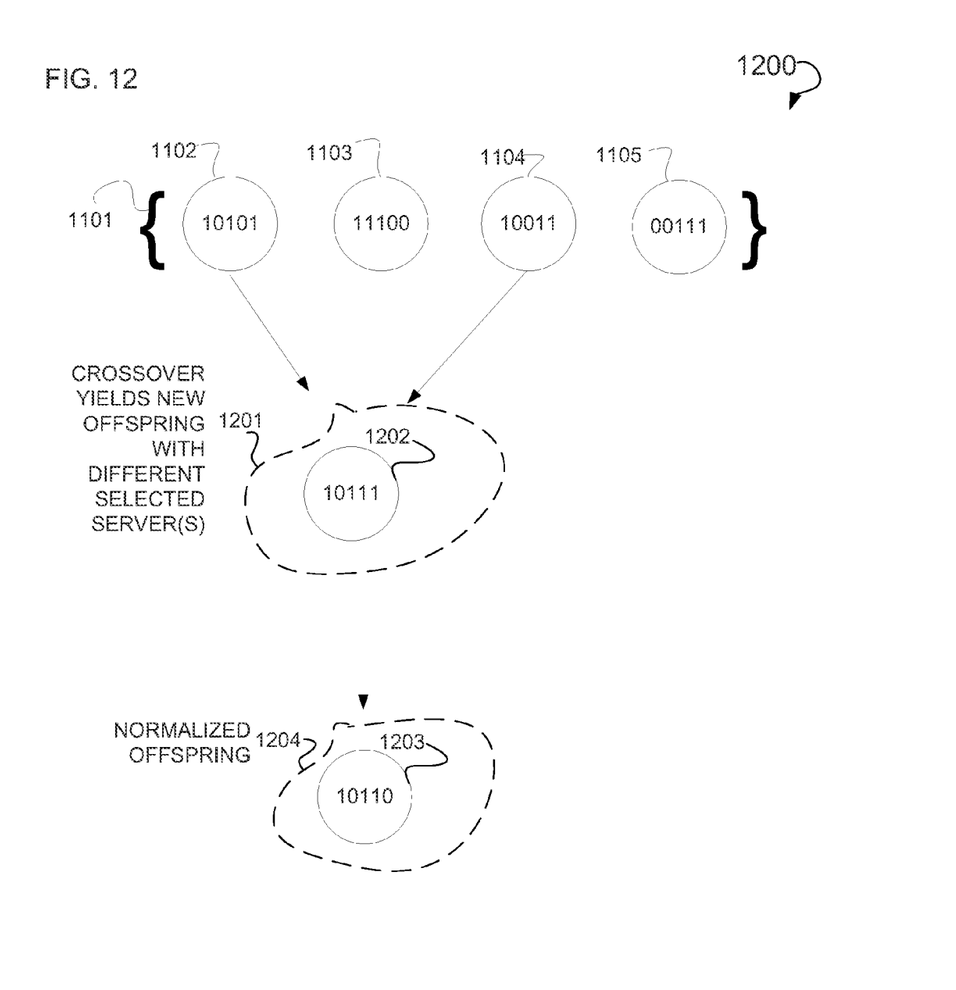
FIG. 12 is a diagram of a system, according to an example embodiment, to create a new candidate using crossover.

FIG. 12 is a diagram of an example system 1200 to create a new candidate using crossover. Shown is the previously described fit candidate set 1101 that includes fit candidates 1102-1105. As illustrated at 1201, the binary strings for two parent candidates 1102 and 1104 may be combined so as to generate a new candidate 1202 (i.e., a child) with the binary string "10111." Further, as illustrated at 1204, this new candidate 1202 may be normalized as a candidate 1203 with a binary string of "10110" to match the number of originally selected servers requested by the job.

Figure 13:
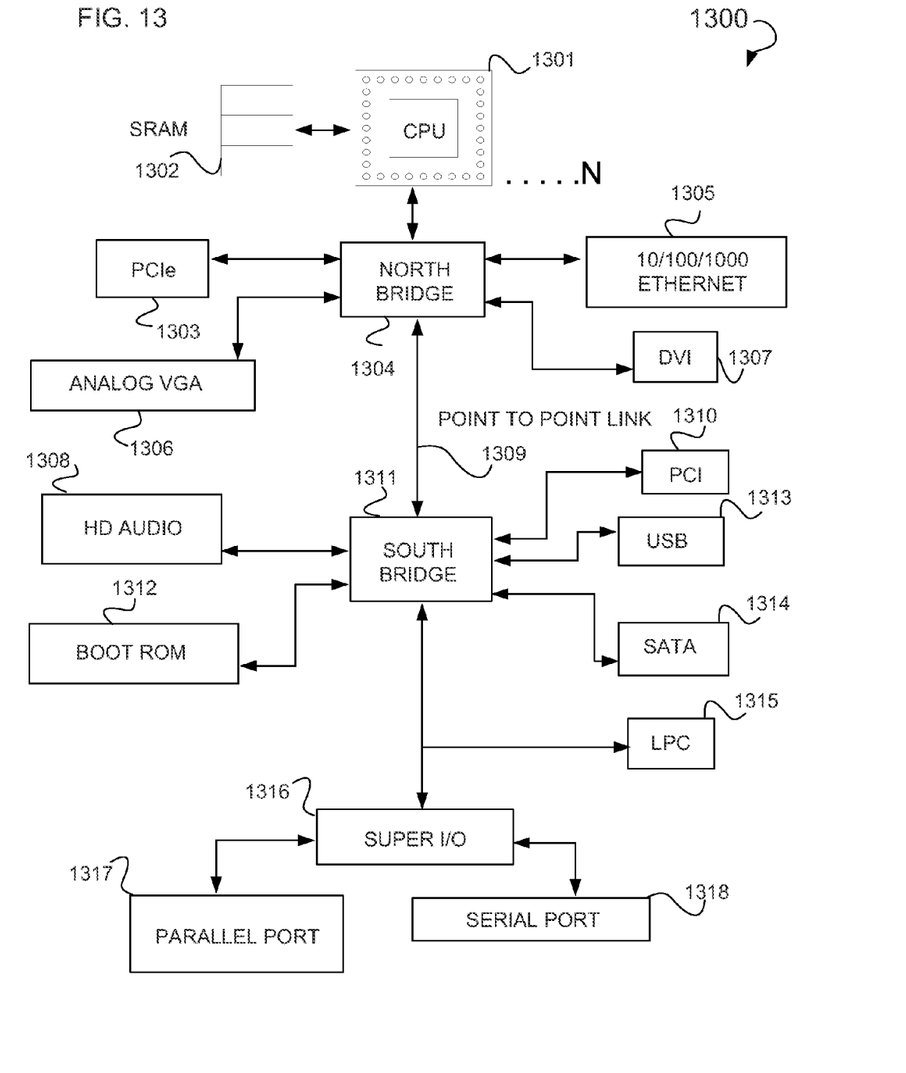
FIG. 13 is a diagram of an example computer system.

FIG. 13 is a diagram of an example computer system 1300. Shown is a CPU 1301. The processor die 201 may be a CPU 1301. In some example embodiments, a plurality of CPU may be implemented on the computer system 1300 in the form of a plurality of core (e.g., a multi-core computer system), or in some other suitable configuration. Some example CPUs include the x86 series CPU. Operatively connected to the CPU 1301 is Static Random Access Memory (SRAM) 1302. Operatively connected includes a physical or logical connection such as, for example, a point to point connection, an optical connection, a bus connection or some other suitable connection. A North Bridge 1304 is shown, also known as a Memory Controller Hub (MCH), or an Integrated Memory Controller (IMC), that handles communication between the CPU and PCIe, Dynamic Random Access Memory (DRAM), and the South Bridge. An ethernet port 1305 is shown that is operatively connected to the North Bridge 1304. A Digital Visual Interface (DVI) port 1307 is shown that is operatively connected to the North Bridge 1304. Additionally, an analog Video Graphics Array (VGA) port 1306 is shown that is operatively connected to the North Bridge 1304. Connecting the North Bridge 1304 and the South Bridge 1311 is a point to point link 1309. In some example embodiments, the point to point link 1309 is replaced with one of the above referenced physical or logical connections. A South Bridge 1311, also known as an I/O Controller Hub (ICH) or a Platform Controller Hub (PCH), is also illustrated. A PCIe port 1303 is shown that provides a computer expansion port for connection to graphics cards and associated GPUs. Operatively connected to the South Bridge 1311 are a High Definition (HD) audio port 1308, boot RAM port 1312, PCI port 1310, Universal Serial Bus (USB) port 1313, a port for a Serial Advanced Technology Attachment (SATA) 1314, and a port for a Low Pin Count (LPC) bus 1315. Operatively connected to the South Bridge 1311 is a Super Input/Output (I/O) controller 1316 to provide an interface for low-bandwidth devices (e.g., keyboard, mouse, serial ports, parallel ports, disk controllers).

Operatively connected to the Super I/O controller 1316 is a parallel port 1317, and a serial port 1318.

The SATA port 1314 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 1302 and/or within the CPU 1301 during execution thereof by the computer system 1300. The instructions may further be transmitted or received over the 10/100/1000 ethernet port 1305, USB port 1313 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

In some example embodiments, the methods illustrated herein are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer implemented method comprising:
   identifying, using a system having a hardware processor, a search space comprising a plurality of interconnected computers, the search space to be used to satisfy a resource request;
   selecting, using the system, from the search space an initial candidate set of clusters, each cluster of the initial candidate set of clusters comprising a unique combination of computers to satisfy the resource request;
   assigning, using the system, a fitness score, based upon a predicted performance, to each cluster of the initial candidate set of clusters;
   transforming, using the system, the initial candidate set of clusters into a fittest candidate set of clusters, wherein each cluster of the fittest candidate set is an offspring from at least one cluster of the initial candidate set; and
   selecting, using the system, at least one cluster of the fittest candidate set of clusters having a best predicted performance to satisfy the resource request.

2. The computer implemented method of claim 1, wherein the resource request includes a request for at least one of network bandwidth, Central Processing Unit (CPU) cycles, electrical power, or memory usage.

3. The computer implemented method of claim 1, wherein the predicted performance includes simulating a usage of each cluster of the initial candidate set.

4. The computer implemented method of claim 1, wherein the fitness score is a comparable value that indicates a predicted performance of a particular cluster as compared to a predicted performance of another cluster of the initial candidate set.

5. The computer implemented method of claim 1, wherein transforming the initial candidate set into the fittest candidate set includes:
   initializing the initial candidate set;
   generating offspring from the initial candidate set; and
   selecting fittest candidates from the offspring.

6. The computer implemented method of claim 5, wherein the generating of the offspring uses a method that includes at least one of mutation, swapping, or crossover.

7. The computer implemented method of claim 6, further comprising normalizing the offspring to match a number of computers included in each cluster of the initial candidate set.

8. The computer implemented method of claim 1, wherein the best predicted performance is a comparable value that indicates a highest predicted performance of a particular cluster as compared to a highest predicted performance of another cluster of the initial candidate set.

9. An apparatus comprising:
   at least one hardware processor;
   a candidate selection module executable on the at least one hardware processor to identify an initial candidate set of clusters, each cluster of the initial candidate set of clusters comprising a unique combination of computers, each cluster of the initial candidate set of clusters associated with resources to perform a job;
   a generation module executable on the at least one hardware processor to transform the initial candidate set of clusters into a fittest candidate set of clusters, wherein each cluster of the fittest candidates to be set is an offspring of a corresponding cluster of the initial candidate set; and
   an offspring selection module executable on the at least one hardware processor to select a particular cluster of the fittest candidate set of clusters having a best predicted performance to perform the job.

10. The apparatus of claim 9, the candidate selection module to receive at least one of an objective function, an application description, or an available resource.

11. The apparatus of claim 9, wherein the apparatus is at least one of a computer system, or plurality of computer systems.

12. The apparatus of claim 9, wherein the resources include at least one of network bandwidth, Central Processing Unit (CPU) cycles, electrical power, or memory usage.

13. A computer system comprising:
   at least one processor;
   a memory in communication with the at least one processor, the memory including logic encoded in one or more tangible media for execution and when executed operable to:
      identify a search space comprising a plurality of interconnected computers, the search space to be used to satisfy a resource request;
      select from the search space an initial candidate set of clusters, each cluster of the initial candidate set of clusters comprising a unique combination of computers to satisfy the resource request;
      assign a fitness score, based upon a predicted performance, to each cluster of the initial candidate set of clusters; and
      transform the initial candidate set of clusters into a fittest candidate set of clusters, wherein each cluster of the fittest candidate set is an offspring from at least one cluster of the initial candidate set; and
      select a cluster of the fittest candidate set to have a best predicted performance to satisfy the resource request.

14. The computer system of claim 13, wherein the resource request includes a request for at least one of network bandwidth, Central Processing Unit (CPU) cycles, electrical power, or memory usage.

15. The computer system of claim 13, wherein the predicted performance includes simulating a usage of each cluster of the initial candidate set.

16. The computer system of claim 13, wherein the fitness score is a comparable value that indicates a predicted performance of a particular cluster as compared to a predicted performance of another cluster of the initial candidate set.

17. The computer system of claim 13 wherein transforming the initial candidate set into the fittest candidate set includes logic encoded in one or more tangible media for execution and when executed operable to:
   initialize the initial candidate set;
   generate offspring from the initial candidate set; and
   select fittest candidates from the offspring.

18. The computer system of claim 17, wherein the generating of the offspring uses a method that includes at least one of mutation, swapping, or crossover.

* * * * *